(12) United States Patent
Harada

(10) Patent No.: US 10,399,442 B2
(45) Date of Patent: Sep. 3, 2019

(54) SOLAR BATTERY SYSTEM

(71) Applicant: TOYOTA JIDOSHA KABUSHIKI KAISHA, Toyota-shi, Aichi-ken (JP)

(72) Inventor: Tadakazu Harada, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 87 days.

(21) Appl. No.: 15/458,443

(22) Filed: Mar. 14, 2017

(65) Prior Publication Data

US 2017/0267113 A1 Sep. 21, 2017

(30) Foreign Application Priority Data

Mar. 16, 2016 (JP) .................. 2016-052704

(51) Int. Cl.
*B60L 53/22* (2019.01)
*B60L 8/00* (2006.01)
(Continued)

(52) U.S. Cl.
CPC ......... *B60L 11/1812* (2013.01); *B60L 3/0084* (2013.01); *B60L 8/003* (2013.01); *B60L 53/22* (2019.02); *B60L 53/60* (2019.02); *B60L 58/20* (2019.02); *H02J 7/007* (2013.01); *H02J 7/35* (2013.01); *B60L 2240/34* (2013.01); *B60L 2240/36* (2013.01); *B60L 2240/662* (2013.01); *Y02T 10/7005* (2013.01); *Y02T 10/7066* (2013.01); *Y02T 10/7072* (2013.01); *Y02T 10/7083* (2013.01); *Y02T 10/7291* (2013.01); *Y02T 90/121* (2013.01); *Y02T 90/128* (2013.01);
(Continued)

(58) Field of Classification Search
CPC .... B60L 11/1812; B60L 3/0084; B60L 8/003; B60L 11/1838; H02J 7/007; H02J 7/35
See application file for complete search history.

(56) References Cited

U.S. PATENT DOCUMENTS

2013/0082645 A1* 4/2013 Fukada .................. H02J 7/0052
320/107
2016/0181970 A1* 6/2016 Sato ......................... H02S 20/32
136/246

(Continued)

FOREIGN PATENT DOCUMENTS

EP 2023482 A1 2/2009
JP S59-092010 U 6/1984
(Continued)

*Primary Examiner* — Jared Fureman
*Assistant Examiner* — Duc M Pham
(74) *Attorney, Agent, or Firm* — Hunton Andrews Kurth LLP

(57) ABSTRACT

A solar battery system includes a first electronic control unit disposed in a vehicle cabin of a vehicle, the first electronic control unit including a control unit repeating a charging period and a stop period during a period of time from ignition-off to ignition-on of the vehicle, the charging period being a period of charging the electric storage device with generated electric power of a solar battery, the stop period being a period of stopping the charging of the electric storage device with the generated electric power of the solar battery. The control unit sets a length of each of the charging periods shorter as the temperature in the vehicle cabin is higher at the time of starting each of the charging periods.

5 Claims, 9 Drawing Sheets

(51) Int. Cl.
*B60L 3/00* (2019.01)
*B60L 53/60* (2019.01)
*B60L 58/20* (2019.01)
*H02J 7/00* (2006.01)
*H02J 7/35* (2006.01)
*B60L 11/18* (2006.01)

(52) U.S. Cl.
CPC ............... *Y02T 90/14* (2013.01); *Y02T 90/16* (2013.01); *Y02T 90/163* (2013.01)

(56) References Cited

U.S. PATENT DOCUMENTS

2016/0272069 A1\* 9/2016 Maeno ..................... B60L 7/12
2016/0301246 A1\* 10/2016 Sato .......................... G05F 1/67

FOREIGN PATENT DOCUMENTS

| JP | 2006-121855 A | 5/2006 |
| JP | 2014-072944 A | 4/2014 |
| JP | 2015-070713 A | 4/2015 |
| JP | 2015-082866 A | 4/2015 |
| JP | 2015-164375 A | 9/2015 |
| WO | 2012/120590 A1 | 9/2012 |

\* cited by examiner

SOLAR BATTERY SYSTEM

INCORPORATION BY REFERENCE

The disclosure of Japanese Patent Application No. 2016-052704 filed on Mar. 16, 2016 including the specification, drawings and abstract is incorporated herein by reference in its entirety.

BACKGROUND

1. Technical Field

The present disclosure relates to a solar battery system mounted in a vehicle.

2. Description of Related Art

There is known a solar battery system including solar batteries capable of supplying generated electric power to an electric storage device that supplies the electric power to a motor that drives a vehicle (see, for example, Japanese Patent Application Publication No. 2015-082866).

SUMMARY

Incidentally, since the electric storage device outputs a relatively high voltage (for example, 200 V or more), presence or absence of abnormality such as overdischarge and overcharge, and other statuses are often monitored. It is, therefore, necessary to receive permission of charging the electric storage device from a monitoring device (such as an HV-ECU). Even while the electric storage device is being charged, the monitoring device needs to continue monitoring the electric storage device. Accordingly, when the electric storage device is charged during a period of time from ignition-off (IG-OFF) to ignition-on (IG-ON) of the vehicle (i.e., during parking of the vehicle), the monitoring device, which is essentially in a sleep state except for required minimum functions, needs to be shifted to a wake state. Consequently, in order to prevent increase in power consumption caused by maintaining the monitoring device in the wake state, a technique (so-called pumping charging) may be adopted in which the electric storage device is intermittently charged with the electric power generated from the solar battery during a period of time from the IG-OFF to the IG-ON of the vehicle.

The IG-ON and the IG-OFF of the vehicle refer to shifting to the state of enabling the vehicle to travel manually or automatically and shifting to the state of disabling the vehicle from traveling manually or automatically, respectively. That is, the IG-ON and the IG-OFF of the vehicle are concepts including not only start and stop of an engine vehicle but also processing of starting an electronic control unit (such as the HV-ECU) that performs integrated control of the entire vehicle in a motor vehicle.

However, the electronic control unit (ECU) that executes charging control of the electric storage device is often disposed in a vehicle cabin. Accordingly, the pumping charging, if performed on a day with a high amount of solar radiation that causes rise in temperature in the vehicle cabin for example, decreases the amount of heat discharged to the outside when the vehicle cabin is lower in temperature than the ECU. When the vehicle cabin is higher in temperature than the ECU, the pumping charging increases the amount of heat received from the outside, which may cause rise in temperature of the ECU and deterioration in operation performance of the ECU.

Accordingly, there is provided a solar battery system capable of suppressing temperature rise in an ECU that performs charging control in the case where an electric storage device is pumping-charged during a period of time from IG-OFF to IG-ON of a vehicle, the electric storage device supplying electric power to an electric motor serving as a driving force source of the vehicle, the electric power being generated from a solar battery.

In a first aspect of the present disclosure, there is provided a solar battery system, including: a solar battery mounted in a vehicle; an electric storage device that supplies electric power to an electric motor serving as a driving force source of the vehicle; an electric power converter provided between the solar battery and the electric storage device; and a first electronic control unit disposed in a vehicle cabin, the first electronic control unit including a control unit that operates the electric power converter so as to charge the electric storage device with generated electric power of the solar battery, the control unit repeating a charging period and a stop period during a period of time from ignition-off to ignition-on of the vehicle, the charging period being a period of charging the electric storage device with the generated electric power, the stop period being a period of stopping the charging of the electric storage device with the generated electric power, and an acquisition unit that acquires temperature in the vehicle cabin of the vehicle. The control unit sets a length of each of the charging periods shorter as the temperature in the vehicle cabin is higher, the temperature being acquired by the acquisition unit at the time of starting each of the charging periods.

According to the first aspect of the present disclosure, the solar battery system includes a solar battery mounted in a vehicle, an electric storage device that supplies electric power to the electric motor serving as a driving force source of the vehicle, and an electric power converter provided between the solar battery and the electric storage device. The solar battery system also includes the first electronic control unit (ECU) disposed in a vehicle cabin, the first electronic control unit (ECU) including a control unit that operates the electric power converter so as to charge the electric storage device with generated electric power of the solar battery, the control unit repeating a charging period and a stop period during a period of time from ignition-off to ignition-on of the vehicle, the charging period being a period of charging the electric storage device with the generated electric power of the solar battery, the stop period being a period of stopping the charging of the electric storage device with the generated electric power of the solar battery. The first electronic control unit (ECU) also includes an acquisition unit that acquires temperature in the vehicle cabin of the vehicle. The control unit of the solar battery system sets a length of each of the charging periods shorter as the temperature in the vehicle cabin is higher, the temperature being acquired by the acquisition unit at the time of starting each of the charging periods. Therefore, as the temperature in the vehicle cabin at the time of starting the charging period becomes higher, the charging period of pumping charging becomes shorter. Accordingly, when the vehicle cabin accommodating the ECU that performs charging control has a high temperature, the amount of heat generation from the ECU during the charging periods can be reduced. Therefore, in the situation where the vehicle cabin has a high temperature and so the ECU tends to have a temperature rise, the amount of heat generation from the ECU decreases during the charging periods of the pumping charging, so that the temperature rise in the ECU can be suppressed.

A second aspect of the present disclosure may provide a solar battery system including a clock that outputs time. In the solar battery system, the acquisition unit estimates the temperature in the vehicle cabin from the time.

According to the second aspect of the present disclosure, the acquisition unit of the solar battery system may estimate the temperature in the vehicle cabin from the time output from the clock. This makes it possible to omit a device such as a temperature sensor that measures the temperature in the vehicle cabin, so that a system configuration can be simplified.

A third aspect of the present disclosure may provide a solar battery system, including a room temperature sensor that detects the temperature in the vehicle cabin. In the solar battery system, the acquisition unit acquires the temperature in the vehicle cabin based on an output signal of the room temperature sensor.

According to the third aspect of the present disclosure, the acquisition unit of the solar battery system may acquire the temperature in the vehicle cabin based on the output signal of the room temperature sensor. Therefore, since the control unit can accurately grasp the temperature in the vehicle cabin, it becomes possible to more appropriately suppress temperature rise in the ECU by making the charging periods of the pumping charging variable.

A fourth aspect of the present disclosure may provide a solar battery system, including a determination unit that determines a temperature state of the first electronic control unit. The control unit starts the charging periods, when the determination unit determines that the temperature of the first electronic control unit is equal to or less than a specified temperature.

According to the fourth aspect of the present disclosure, the control unit of the solar battery system starts the charging periods, when the temperature of the ECU is determined to be the specified temperature or less. Therefore, the pumping charging is started for the first time when the temperature of the ECU decreases to some extent, so that the temperature rise in the ECU can further be suppressed.

The solar battery system may include a controller, and the controller may include a first charging control unit and a second charging control unit. The first charging control unit may perform operation control of the electric power converter during a period of time from the ignition-on to the ignition-off of the vehicle so as to perform control processing that charges an auxiliary battery with the generated electric power of the solar battery. The second charging control unit may perform operation control of the electric power converter during a period of time from the ignition-off to the ignition-on of the vehicle so as to perform control processing that charges the electric storage device and the auxiliary battery with the generated electric power of the solar battery. When starting each of the charging periods, the second charging control unit may transmit a signal requesting permission of charging the electric storage device to a second electronic control unit that performs integrated control of an entire vehicle. When a permission signal is received from the second electronic control unit that performs integrated control of the entire vehicle, the second charging control unit may perform control of repeating the charging period and the stop period for the electric storage device and performs control of repeating a charging period and a stop period for the auxiliary battery, the charging period being a period of charging the auxiliary battery with the generated electric power, the stop period being a period of stopping charging of the auxiliary battery with the generated electric power. When the permission signal is not received, the second charging control unit may perform control of repeating the charging period and the stop period for the auxiliary battery, while maintaining the electric storage device in a charging stop state.

In the solar battery system, the control unit may set a length of each of the charging periods shorter in a plurality of stages as the temperature in the vehicle cabin is higher, the temperature being acquired by the acquisition unit at the time of starting each of the charging periods.

In the solar battery system, the control unit may continuously set a length of each of the charging periods shorter as the temperature in the vehicle cabin is higher, the temperature being acquired by the acquisition unit at the time of starting each of the charging periods.

According to the present embodiment, it becomes possible to provide a solar battery system capable of suppressing temperature rise in an ECU that performs charging control when an electric storage device is pumping-charged during a period of time from IG-OFF to IG-ON of a vehicle, the electric storage device supplying electric power to an electric motor serving as a driving force source of the vehicle, the electric power being generated from a solar battery.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, modes for carrying out the present disclosure will be described with reference to the drawings.

First Embodiment

Figure 1:
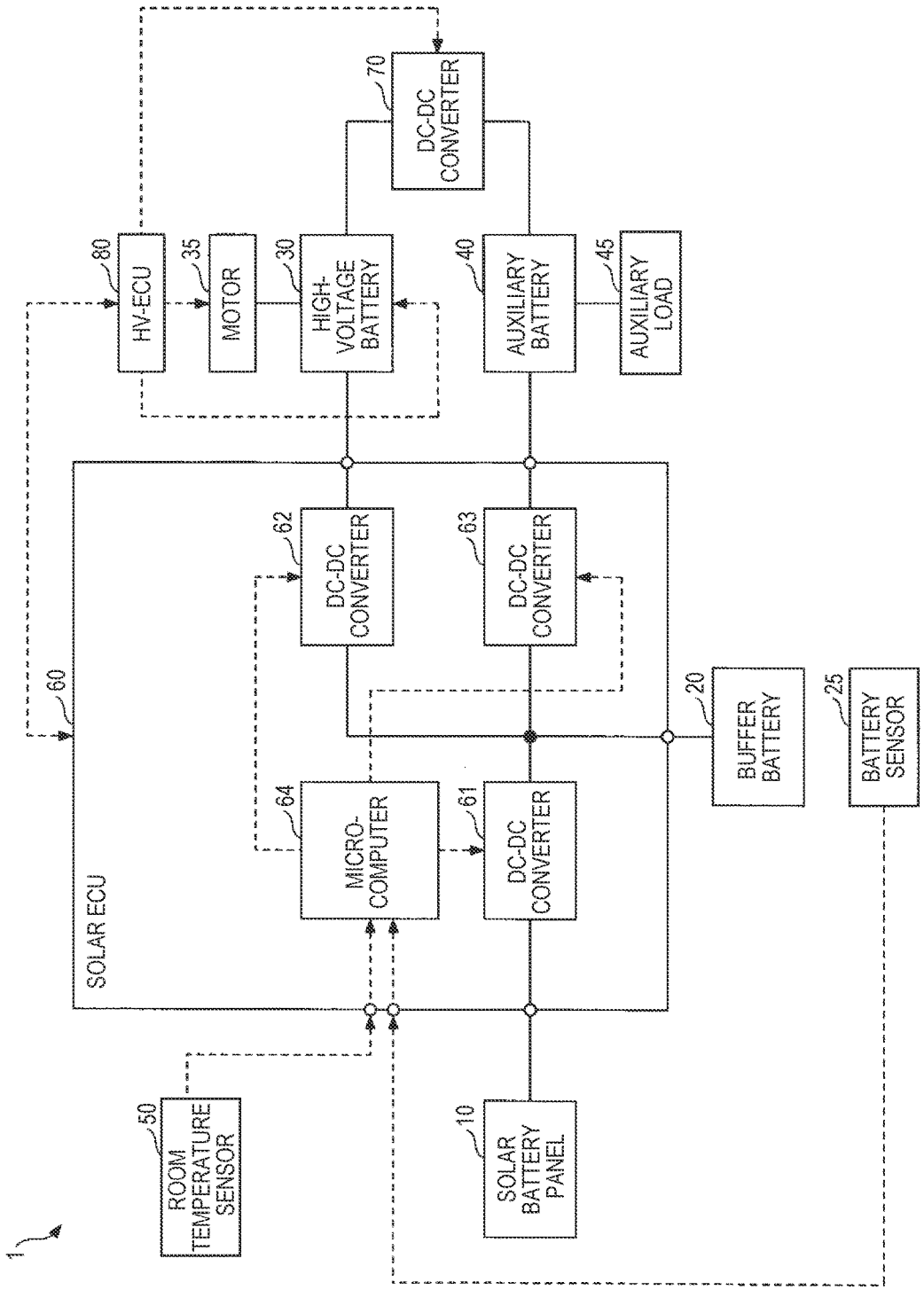
FIG. 1 is a block diagram schematically illustrating one example of the configuration of a solar battery system according to a first embodiment.

FIG. 1 is a block diagram schematically illustrating one example of the configuration of a solar battery system 1 according to the present embodiment. The solar battery system 1, which is mounted in a vehicle, includes a solar battery panel 10, a buffer battery 20, a battery sensor 25, a high-voltage battery 30, a motor 35, an auxiliary battery 40, an auxiliary load 45, a room temperature sensor 50, and a solar ECU 60. Hereinafter, unless otherwise specified, a term "vehicle" refers to a vehicle in which the solar battery system 1 is mounted.

The vehicle includes a DC-DC converter 70 and an HV-ECU (electronic control unit that performs integrated control of the entire vehicle in a motor vehicle) 80 as the elements relating to the solar battery system 1.

In FIG. 1, a solid line represents an electric power system, and a dotted line represents a control (signal) system.

The solar battery panel 10 is a panel-like module constituted of a plurality of solar battery cells connected in series and in parallel. The solar battery panel 10 is mounted in a sunny place (for example, the surface of a roof panel) on the vehicle. The solar battery panel 10 can output generated electric power (for example, a maximum output of 150 W) corresponding to the amount of solar radiation. Solar battery cells of any type are applicable as the solar battery cells included in the solar battery panel 10. For example, optimum solar battery cells (for example, solar battery cells for mobiles) are selected in accordance with the application.

The buffer battery 20 is an electric storage device that temporarily stores the generated electric power of the solar battery panel 10. For example, the buffer battery 20 is a secondary battery, such as a nickel hydrogen battery and a lithium-ion battery, with a rated voltage of 20 V.

The battery sensor 25 is a known detection means to detect various states (current, voltage, temperature, a charging state, etc.) of the buffer battery 20. The battery sensor 25 is communicably connected with the solar ECU 60 through in-vehicle networks, such as a one-to-one communication line and a controller area network (CAN). Detection signals relating to various states of the buffer battery 20 are transmitted to the solar ECU 60.

The high-voltage battery 30 is an electric storage device with a relatively high voltage (for example, output voltage of 200 V to 400 V) that supplies electric power to the motor 35. For example, the high-voltage battery 30 is a secondary battery, such as a nickel hydrogen battery and a lithium-ion battery. The high-voltage battery 30 can be charged with the electric power (generated electric power supplied from the solar battery panel 10 via the buffer battery 20) supplied from the buffer battery 20 through the DC-DC converter 62.

The motor 35 is a driving force source that drives the vehicle. The motor 35 can perform regenerative power generation during deceleration of the vehicle. The regenerative power can be supplied to the high-voltage battery 30 and be used for charging.

The auxiliary battery 40 is an electric storage device that supplies drive power to the auxiliary load 45. The auxiliary battery 40 is a secondary battery, such as a lead battery, a nickel-hydrogen battery, and a lithium-ion battery, with a rated voltage of 12 V. The auxiliary battery 40 can be connected with the buffer battery 20 through the DC-DC converter 63 and be charged with the electric power supplied from the buffer battery 20 (the generated electric power supplied from the solar battery panel 10 via the buffer battery 20).

The auxiliary load 45, which is mounted in a vehicle, is an electric load (such as various ECUs including lighting devices, a wiper device, an audio device, and the solar ECU 60) driven with a relatively low voltage (for example, about 12 V to 15 V).

The room temperature sensor 50 is one example of an output unit that outputs the information about the temperature in the vehicle cabin of the vehicle. The room temperature sensor 50 detects the temperature in the vehicle cabin and outputs the detection result (detection signal). For example, the room temperature sensor 50 is disposed in the vicinity of the solar ECU 60 mounted under a rear seat (on a floor panel under the rear seat to be specific) in the vehicle cabin. The room temperature sensor 50 is communicably connected with the solar ECU 60 through a one-to-one communication line and an in-vehicle network such as the CAN. The detection signal corresponding to the detected temperature in the vehicle cabin is transmitted to the solar ECU 60.

The solar ECU 60 is an electronic control unit that performs control processing regarding the photovoltaic power generation with the solar battery panel 10 and control processing of charging the high-voltage battery 30 and the auxiliary battery 40 with the generated electric power of the solar battery panel 10. For example, the solar ECU 60 is mounted under the rear seat (on the floor panel under the rear seat to be specific) in the vehicle cabin as described before. The solar ECU 60 includes DC-DC converters 61 to 63 and the microcomputer (controller) 64.

The DC-DC converter 61 is an electric power converter that can regulate generated current or generated voltage of the solar battery panel 10. The DC-DC converter 61 is also an electric power converter that converts the electric power supplied from the solar battery panel 10 into the electric power in a voltage range suitable for the buffer battery 20. For example, the DC-DC converter 61 operates such that the generated current or generated voltage of the solar battery panel 10 becomes a set value prescribed in a control command from the microcomputer 64 (a later-described solar power generation control unit 641 to be specific) in response to the control command.

The DC-DC converter 62 is an electric power converter provided between the buffer battery 20 and the high-voltage battery 30. The DC-DC converter 62 regulates (for example, boosts) the voltage input from the buffer battery 20, and outputs the regulated voltage to the high-voltage battery 30. The DC-DC converter 62 can regulate the electric power output to the high-voltage battery 30 in response to a control command from the microcomputer 64 (a later-described second charging control unit 643 to be specific). That is, by regulating the voltage output to the high-voltage battery 30, the DC-DC converter 62 can regulate the electric power amount supplied from the buffer battery 20 to the high-voltage battery 30, and can prevent electric power supply from the buffer battery 20 to the high-voltage battery 30.

The DC-DC converter 63 is an electric power converter provided between the buffer battery 20 and the auxiliary battery 40. The DC-DC converter 63 regulates (for example, steps down) the voltage input from the buffer battery 20, and outputs the regulated voltage to the auxiliary battery 40. The DC-DC converter 63 can regulate the electric power output to the auxiliary battery 40 in response to a control command from the microcomputer 64 (the later-described first charging control unit 642 or the second charging control unit 643 to be specific). That is, by regulating the voltage output to the auxiliary battery 40, the DC-DC converter 63 can regulate the electric power amount supplied from the buffer battery 20 to the auxiliary battery 40, and can prevent electric power supply from the buffer battery 20 to the auxiliary battery 40.

Note that some or all of the DC-DC converters 61 to 63 may be provided in the outside of the solar ECU 60.

For example, the microcomputer 64 includes component members such as a CPU, a RAM, a ROM, and input-output terminals. The microcomputer 64 can implement various control processings by executing various programs stored in the ROM on the CPU. Hereinafter, the functional blocks of the microcomputer 64 will be described with reference to FIG. 2.

Figure 2:
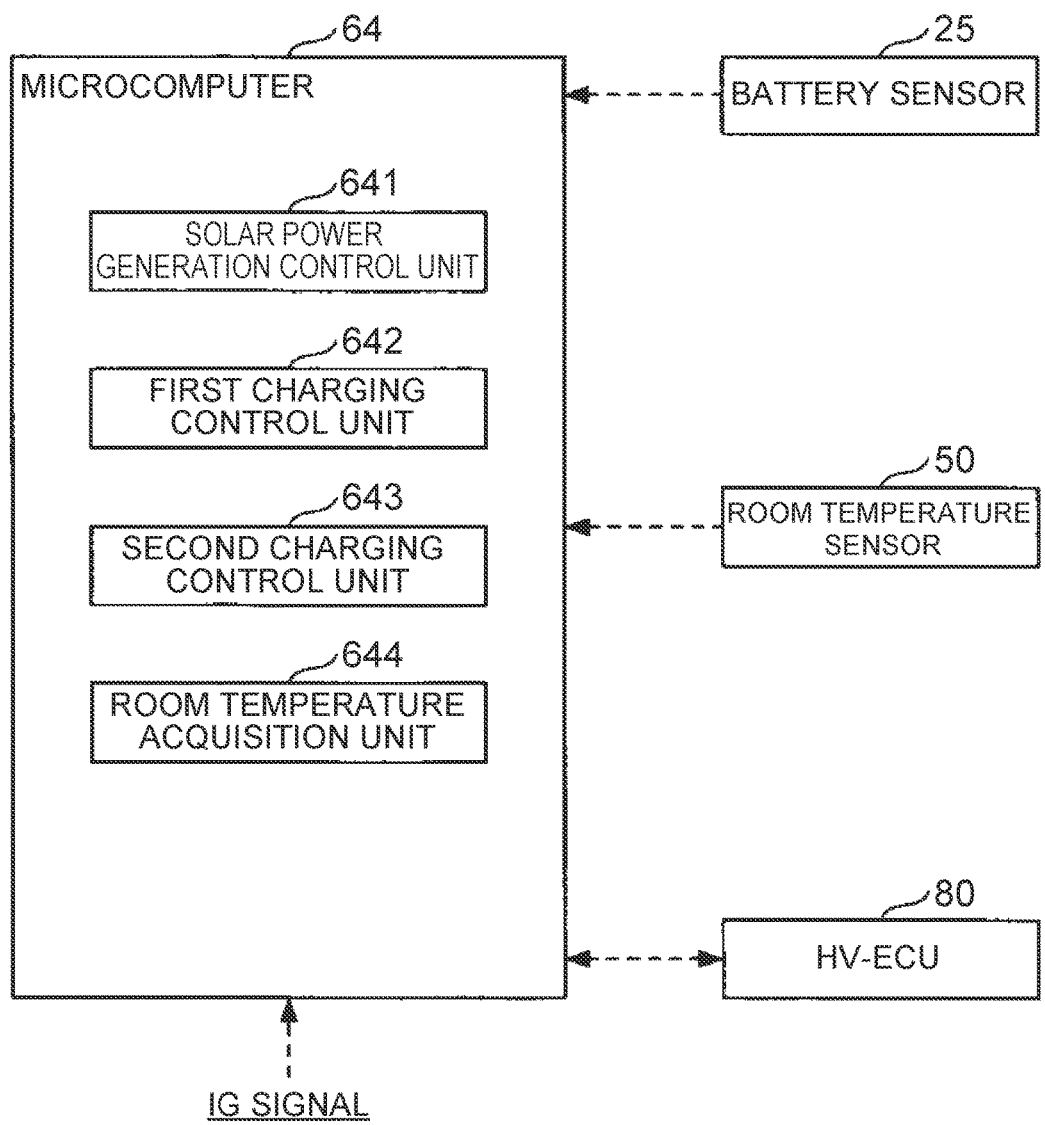
FIG. 2 is a functional block diagram of a microcomputer in a solar ECU according to the first embodiment.

FIG. 2 is a functional block diagram of the microcomputer 64 according to the present embodiment.

The microcomputer 64 includes a solar power generation control unit 641, a first charging control unit 642, a second charging control unit 643, and a room temperature acquisition unit 644 as function units implemented by executing one or more programs on the CPU.

The solar power generation control unit 641 performs operation control of the DC-DC converter 61 so as to execute power generation control of the solar battery panel 10, such as a known maximum power point tracking (MPPT) control. The solar power generation control unit 641 outputs, to the DC-DC converter 61, a control command including a set value of the generated current or generated voltage of the solar battery panel 10 (the input current or input voltage of the DC-DC converter 61). As a result, the MPPT control of the solar battery panel 10 is executed while the generated current and the generated voltage of the solar battery panel 10 are being changed.

The first charging control unit 642 performs operation control of the DC-DC converter 63 during a period of time from IG-ON (completion of initial processing after IG-ON to be specific) to IG-OFF of the vehicle so as to perform control processing of charging the auxiliary battery 40 with the generated electric power of the solar battery panel 10. The first charging control unit 642 sets an output voltage of the DC-DC converter 63 (a voltage of the DC-DC converter 63 on the side connected to the auxiliary battery 40) to a set value set to be higher than the voltage of the auxiliary battery 40. The first charging control unit 642 then outputs a control command including the set value to the DC-DC converter 63. As a consequence, the DC-DC converter 63 performs, for example, switching operation so that the output voltage becomes the set value included in the control command, and supplies the generated electric power of the solar battery panel 10 to the auxiliary battery 40 through the buffer battery 20. Moreover, the first charging control unit 642 may regulate the amount of electric power output from the DC-DC converter 63 to the auxiliary battery 40 in accordance with a state of charge (SOC) of the auxiliary battery 40 input from the battery sensor 25.

The second charging control unit 643 performs operation control of the DC-DC converters 62, 63 during a period of time from the IG-OFF to the IG-ON of the vehicle so as to perform control processing of charging the high-voltage battery 30 and the auxiliary battery 40 with the generated electric power of the solar battery panel 10. Specifically, the second charging control unit 643 intermittently charges the high-voltage battery 30 and the auxiliary battery 40 with the generated electric power of the solar battery panel 10 during a period of time from the IG-OFF to the IG-ON of the vehicle. That is, the second charging control unit 643 performs pumping charging that repeats a charging period and a stop period, the charging period being a period of charging the high-voltage battery 30 and the auxiliary battery 40 with the generated electric power of the solar battery panel 10, the stop period being a period of stopping charging of the high-voltage battery 30 and the auxiliary battery 40 with the generated electric power of the solar battery panel 10. As described later, at the time of charging the high-voltage battery 30, the HV-ECU 80 needs to maintain a wake state and to monitor the high-voltage battery 30. Accordingly, in a mode of constantly charging the high-voltage battery 30, there is a possibility that the power consumption of the HV-ECU 80 is higher than the power generation capacity of the solar battery panel 10 depending on the magnitude of solar radiation intensity. Accordingly, since intermittent charging can reduce the time of the wake state maintained by the HV-ECU 80, the power consumption of the HV-ECU 80 can be suppressed and power-saving can be attained.

When the pumping charging is performed (that is, at the time of starting each charging period), the second charging control unit 643 transmits a signal (request signal) of requesting a charging permission of the high-voltage battery 30 to the HV-ECU 80. Then, when the permission signal is received from the HV-ECU 80, the second charging control unit 643 performs the pumping charging of the high-voltage battery 30 and the auxiliary battery 40. On the contrary, when the permission signal cannot be received, the second charging control unit 643 performs the pumping charging of the auxiliary battery 40, while maintaining the high-voltage battery 30 in a charging stop state. This is because the high-voltage battery 30 can be charged and discharged for the first time when the HV-ECU 80 permits the charging, since the HV-ECU 80 monitors various states of the high-voltage battery 30 relating to the presence or absence of abnormality from a viewpoint of safety because the high-voltage battery 30 is an electric storage device that outputs a relatively high voltage as describe before.

The second charging control unit 643 sets an output voltage of the DC-DC converter 62 (a voltage of the DC-DC converter 62 on the side connected to the high-voltage battery 30) to a set value set to be higher than the voltage of the high-voltage battery 30. The second charging control unit 643 then outputs a control command including the set value to the DC-DC converter 62. As a consequence, the DC-DC converter 62 performs, for example, switching operation so that the output voltage becomes the set value included in the control command, and supplies the generated electric power of the solar battery panel 10 to the high-voltage battery 30 through the buffer battery 20. Like the first charging control unit 642, the second charging control unit 643 sets the output voltage of the DC-DC converter 63 to a set value set to be higher than the voltage of the auxiliary battery 40, and outputs a control command including the set value to the DC-DC converter 63. As a consequence, the DC-DC converter 63 performs, for example, switching operation so that the output voltage becomes the set value included in the control command, and supplies the generated electric power of the solar battery panel 10 to the auxiliary battery 40 through the buffer battery 20. The details of the pumping charging by the second charging control unit 643 will be described later.

The room temperature acquisition unit 644 acquires a temperature Tin in the vehicle cabin based on a detection signal received from the room temperature sensor 50. The information about the temperature Tin in the vehicle cabin acquired by the room temperature acquisition unit 644 is transmitted to the second charging control unit 643.

With reference again to FIG. 1, the DC-DC converter 70 is an electric power converter provided between the high-voltage battery 30 and the auxiliary battery 40. The DC-DC converter 70 converts the electric power from the high-voltage battery 30 into the electric power in a voltage range suitable for the auxiliary battery 40 in response to a control command input from the HV-ECU 80. The DC-DC converter 70 then supplies the converted electric power to the auxiliary battery 40. As a result, it becomes possible to charge the auxiliary battery 40 with the electric power from the high-voltage battery 30.

The HV-ECU 80 is an electronic control unit that performs integrated control of the entire vehicle corresponding to data such as a traveling state of the vehicle, an operation state, and states of various units (such as the high-voltage battery 30 and the motor 35).

The HV-ECU 80 performs drive control of the motor 35 in accordance with data such as the traveling state of the vehicle, the operation state, and the various states of the high-voltage battery 30. The HV-ECU 80 also determines the presence or absence of abnormality of the motor 35 based on data such as an input from a current sensor (not illustrated) that detects the current of the motor 35. When the presence of abnormality is determined, the HV-ECU 80 performs fail-safe control including the operation of stopping driving of the motor 35 and the operation of shifting to an evacuation travelling mode.

The HV-ECU 80 monitors the state of the high-voltage battery 30, such as the charging state, a degradation state, and the presence or absence of abnormality, based on the information about the various states (such as voltage, current, and temperature) input from a monitor unit (not illustrated) of the high-voltage battery 30. When the high-voltage battery 30 is determined to have an abnormality, the HV-ECU 80 performs a fail-safe control including the operation of opening a shutdown relay between the high-voltage battery 30 and a load such as the motor 35, and stopping charge and discharge of the high-voltage battery 30.

The HV-ECU 80 also performs operation control of the DC-DC converter 70 in accordance with the states such as the charging state of the high-voltage battery 30 and the charging state of the auxiliary battery 40 so as to charge the auxiliary battery 40 with the electric power from the high-voltage battery 30.

In the period of time from the IG-OFF to the IG-ON of the vehicle (i.e., during parking of the vehicle), the HV-ECU 80 is put in a sleep state in which all the functions other than the necessary minimum functions are stopped, so that power consumption is suppressed. The necessary minimum functions include, for example, a function of receiving signals, such as an input signal from the monitor unit of the high-voltage battery 30.

When receiving a request signal transmitted from the solar ECU 60 (the second charging control unit 643 to be specific), the HV-ECU 80 wakes up from the sleep state (shifts to the wake state), and determines whether to permit or prohibit the charging of the high-voltage battery 30 in accordance with the information such as the presence or absence of abnormality of the high-voltage battery 30. In the case of permitting the charging, the HV-ECU 80 transmits a permission signal to the solar ECU 60 (the second charging control unit 643) through an in-vehicle network and the like. Then, until the charging period of the pumping charging is ended, the HV-ECU 80 maintains the wake state and monitors the high-voltage battery 30 based on the information about the various states of the high-voltage battery 30 input from the monitor unit. Upon reception of an end signal indicating the end of the charging period from the solar ECU 60 (the second charging control unit 643 to be specific), the HV-ECU 80 shifts again to the sleep state.

Figure 3:
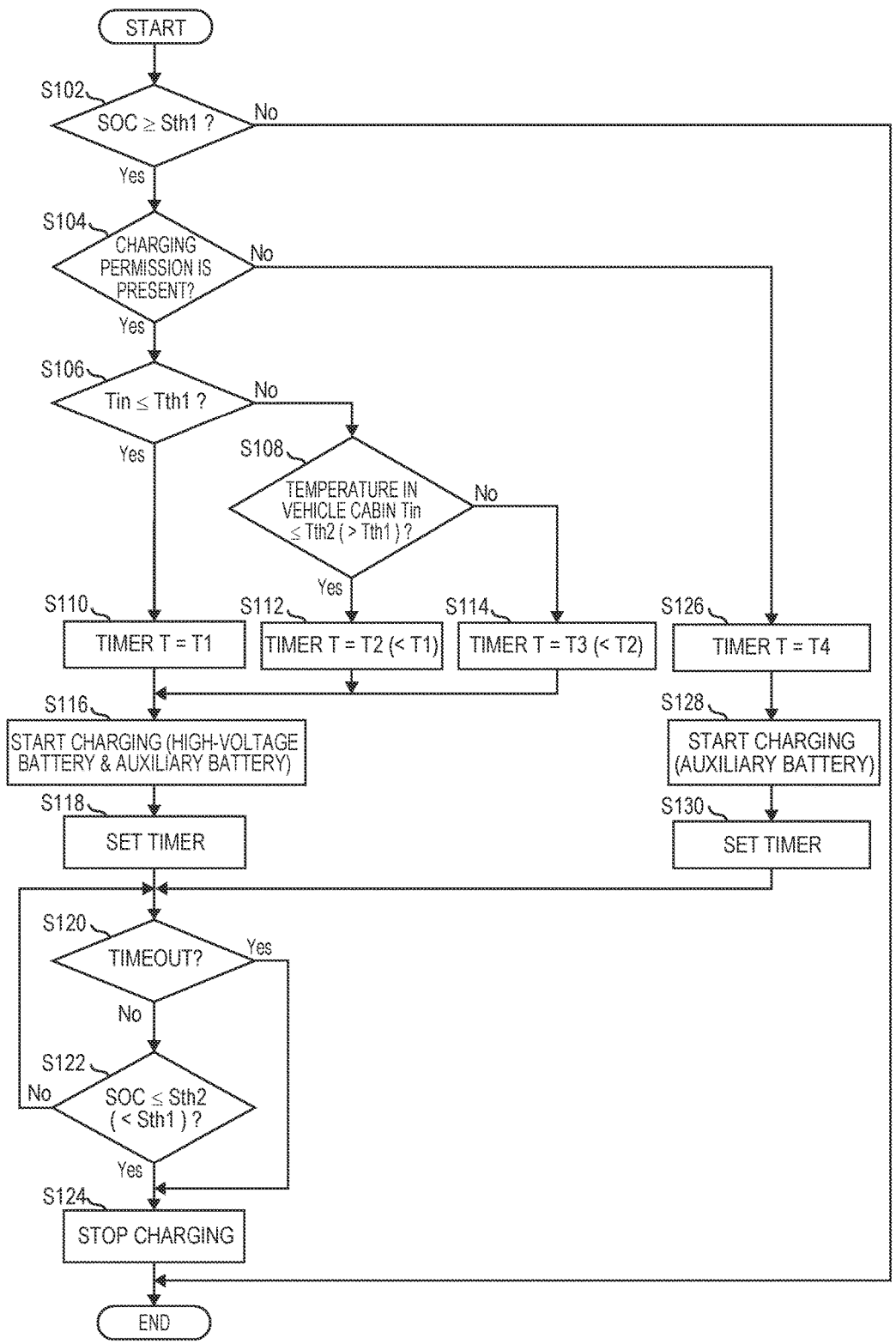
FIG. 3 is a flowchart schematically illustrating one example of pumping charging control processing by the solar battery system (second charging control unit) according to the first embodiment.

A description is now given of the details of the pumping charging by the second charging control unit 643 with reference to FIG. 3.

FIG. 3 is a flowchart schematically illustrating one example of pumping charging control processing by the solar battery system 1 (second charging control unit 643) according to the present embodiment. The processing based on the flowchart is repeatedly executed at predetermined time intervals during the period of time from the IG-OFF to the IG-ON of the vehicle.

In step S102, the second charging control unit 643 determines whether or not the SOC of the buffer battery 20 is equal to or more than a specified first threshold Sth1 based on a detection signal received from the battery sensor 25. When the SOC of the buffer battery 20 is equal to or more than the first threshold Sth1, the second charging control unit 643 advances processing to step S104. When the SOC of the buffer battery 20 is not equal to or more than the first threshold Sth1, the second charging control unit 643 ends the current processing.

The power generation capacity of the solar battery panel 10 varies in accordance with the magnitude of solar radiation intensity. Accordingly, even on days with a low solar radiation intensity, the first threshold Sth1 is preset as a value of the SOC of the buffer battery 20 that is high enough to charge the high-voltage battery 30 and the auxiliary battery 40, assuming that the electric power is drawn from the buffer battery 20.

In step S104, the second charging control unit 643 transmits a request signal to the HV-ECU 80, and determines whether or not a permission signal is returned from the HV-ECU 80. When receiving the permission signal from the HV-ECU 80, the second charging control unit 643 advances processing to step S106. When the permission signal cannot be received, the second charging control unit 643 advances processing to step S126.

In step S106, the second charging control unit 643 determines whether or not the temperature Tin in the vehicle cabin acquired by the room temperature acquisition unit 644 is equal to or less than a specified first temperature Tth1. When the temperature Tin in the vehicle cabin is not equal to or less than the first temperature Tth1, the second charging control unit 643 advances processing to step S108. When the temperature Tin in the vehicle cabin is equal to or less than the first temperature Tth1, the second charging control unit 643 advances processing to step S110.

In step S108, the second charging control unit 643 determines whether or not the temperature Tin in the vehicle cabin acquired by the room temperature acquisition unit 644 is equal to or less than a specified second temperature Tth2 (>Tth1). When the temperature Tin in the vehicle cabin is equal to or less than the second temperature Tth2, the second charging control unit 643 advances processing to step S112. When the temperature Tin in the vehicle cabin is not equal to or less than the second temperature Tth2 (i.e., the temperature Tin in the vehicle cabin is higher than the second temperature Tth2), the second charging control unit 643 advances processing to step S114.

In step S110, the second charging control unit 643 sets timer time T to a specified first time T1 (T=T1).

In step S112, the second charging control unit 643 sets the timer time T to a specified second time T2 (<T1) (T=T2<T1).

In step S114, the second charging control unit 643 sets the timer time T to a specified third time T3 (<T2<T1) (T=T3<T2<T1).

The timer time T (the first time T1, the second time T2, or the third time T3) set in steps S110 to S114 corresponds to the length of each charging period in the pumping charging.

After the timer time T is set by any one of the processes in steps S110 to S114, the second charging control unit 643 starts charging of the high-voltage battery 30 and the auxiliary battery 40 (i.e., starts the charging period in the pumping charging) in step S116. Then, in step S118, the timer is set to the timer time T set in any one of the processes in steps S110 to S114.

In step S120, the second charging control unit 643 determines whether or not the timer is timed out. When the timer is not timed out, the second charging control unit 643 advances processing to step S122. When the timer is timed out, the second charging control unit 643 advances processing to step S124.

In step S122, the second charging control unit 643 determines whether or not the SOC of the buffer battery 20 is equal to or more than a specified second threshold Sth2 (<Sth1) based on a detection signal received from the battery sensor 25. When the SOC of the buffer battery 20 is equal to or more than the second thresholds Sth2, the second charging control unit 643 returns processing to step S120 and repeats the processing. When the SOC of the buffer battery 20 is not equal to or more than the second threshold Sth2, the second charging control unit 643 advances processing to step S124.

The second threshold Sth2 is preset based on an experiment, a simulation, and various specifications of the buffer battery 20 from a viewpoint of suppressing progress of deterioration caused by a decreased SOC of the buffer battery 20.

In step S124, the second charging control unit 643 stops charging (i.e., ends the charging period in the pumping charging), transmits an end signal indicating the end of the charging period to the HV-ECU 80, and ends the current processing.

Meanwhile, when the permission signal cannot be received from the HV-ECU 80 in step S104, the second charging control unit 643 sets the timer time T to a specified fourth time T4 in step S126.

In step S128, the second charging control unit 643 starts charging of the auxiliary battery 40. Then, in step S130, the timer is set to the timer time T (=T4) set in step S126, and processing proceeds to step S120. The processing in steps S120 to S124 is the same as that in the case of charging both the high-voltage battery 30 and the auxiliary battery 40.

Figure 4A:
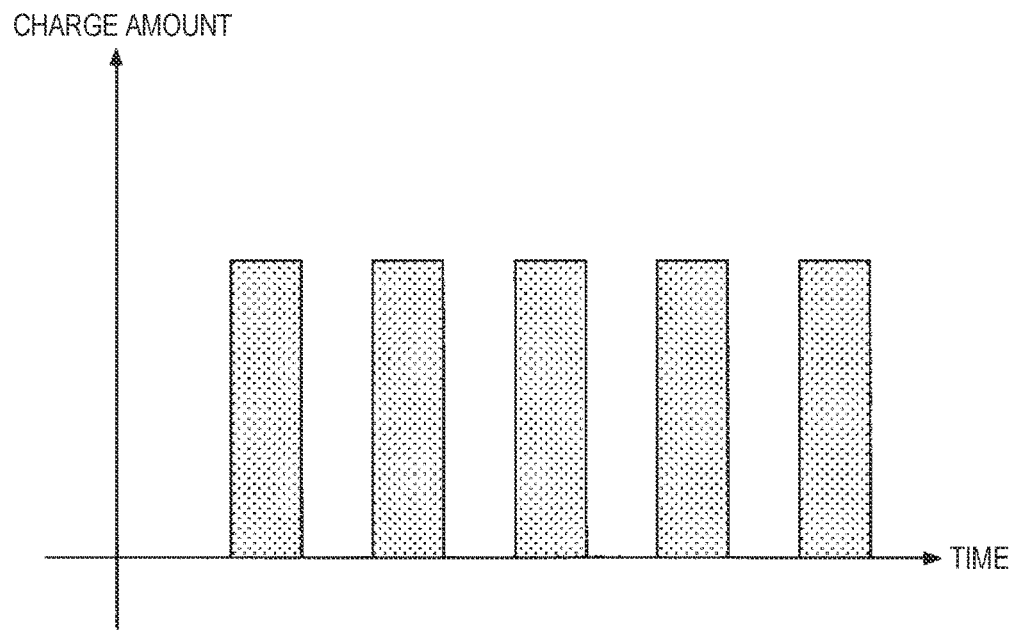
FIG. 4A is an explanatory view illustrating the outline of the pumping charging in a solar battery system according to a comparative example.
Figure 4B:
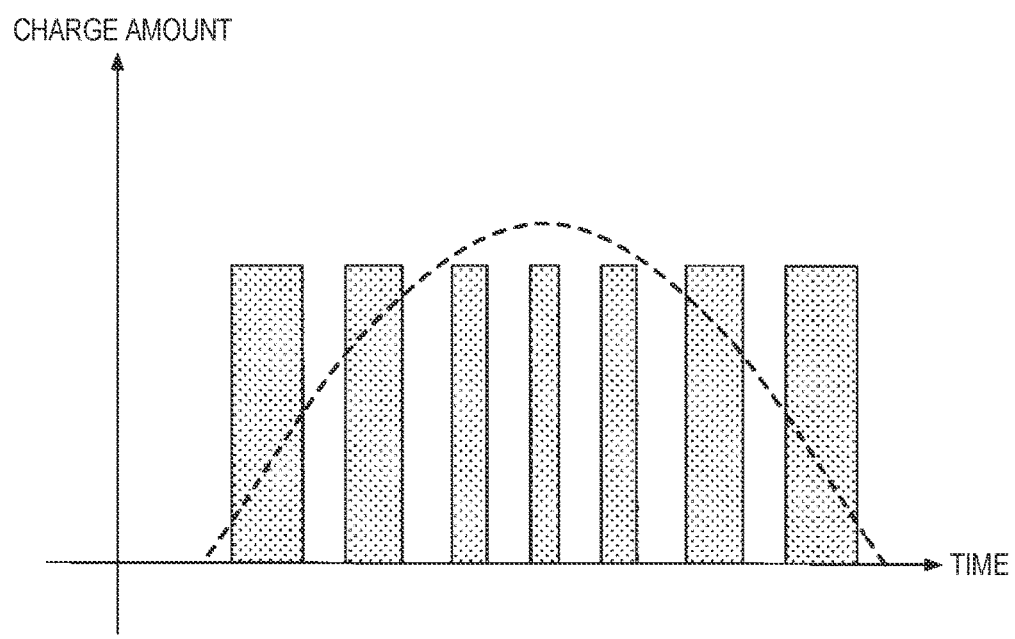
FIG. 4B is an explanatory view illustrating the outline of the pumping charging in the solar battery system according to the first embodiment.

A description is now given of the functions of the solar battery system 1 according to the present embodiment with reference to FIGS. 4A and 4B.

FIGS. 4A and 4B are explanatory views illustrating the outline of the pumping charging in a solar battery system according to a comparative example and the solar battery system 1 according to the present embodiment. FIG. 4A is an explanatory view illustrating the outline of the pumping charging in the solar battery system according to the comparative example. Specifically, FIG. 4A illustrates one example of change in the charging amount of the high-voltage battery 30 due to the pumping charging with the lapse of time. FIG. 4B is an explanatory view illustrating the outline of the pumping charging in the solar battery system 1 according to the present embodiment. Specifically, FIG. 4B illustrates one example of change in the charging amount of the high-voltage battery 30 due to the pumping charging with the lapse of time.

The solar battery system according to the comparative example is different from the solar battery system 1 according to the present embodiment mainly in the point that the processing of steps S106 to S114 in the flowchart illustrated in FIG. 3 is omitted and that a fixed-time timer is set independently of the temperature in the vehicle cabin in step S118. That is, unlike the present embodiment, in the solar battery system according to the comparative example, the length of the charging periods in the pumping charging is constant. In the description of the solar battery system according to the comparative example below, the component members similar to those in the present embodiment will be designated by similar reference signs.

FIGS. 4A and 4B are based on the assumption that the permission signal is receivable from the HV-ECU 80. In FIG. 4B, time change (dotted line) in the temperature Tin in the vehicle cabin is illustrated in unison with time change in the charge amount of the high-voltage battery 30.

First, as illustrated in FIG. 4A, the length of each charging period in the pumping charging is constant in the solar battery system according to the comparative example.

Since the pumping charging is executed during a period of time between the IG-OFF and the IG-ON of the vehicle, i.e., during parking of the vehicle, the temperature environment in the vehicle cabin incorporating the solar ECU 60 changes a lot during the day. Particularly in the daytime in summer with a strong solar radiation, the temperature in the vehicle cabin may exceed 50° C. to 60° C. As the solar radiation intensity becomes higher, the generated electric power of the solar battery panel 10 increases, which generally causes increased loss of the DC-DC converter 61 and an increased amount of heat generation from the solar ECU 60. Accordingly, when the length of each charging period in the pumping charging is constant, the heat generated during each charging period can be discharged in each stop period at night and in the morning. However, it may be impossible to sufficiently discharge in each stop period the heat generated during each charging period in the daytime with a strong solar radiation. As a result, the temperature of the solar ECU 60 may increase and thereby the operation performance of the solar ECU 60 may deteriorate.

On the contrary, in the solar battery system 1 according to the present embodiment, as the temperature Tin in the vehicle cabin at the time of starting each charging period of the pumping charging becomes higher, the length of each charging period becomes shorter as illustrated in FIG. 4B. Accordingly, in the situation where the temperature Tin in the vehicle cabin rises, the length of each charging period in the pumping charging is shortened. As a result, the amount of heat generation in each charging period is reduced, so that the temperature rise in the solar ECU 60 can be suppressed.

In the present embodiment, the length of each charging period of the pumping charging is shortened in three stages as the temperature Tin in the vehicle cabin becomes higher as described before. However, the length of each charging period may be shortened in four or more stages, or the length of each charging period may be shortened simply in two stages. That is, in the present embodiment, the length of each charging period may be shortened in a plurality of stages, as the temperature Tin in the vehicle cabin becomes higher. Moreover, the length of each charging period of the pumping charging may continuously be shortened, as the temperature Tin in the vehicle cabin becomes higher in the entire or part of a temperature range that is a target of the temperature Tin in the vehicle cabin.

Since the solar battery system 1 according to the present embodiment includes the room temperature sensor 50, the second charging control unit 643 can accurately grasp the temperature Tin in the vehicle cabin. Therefore, it becomes possible to more appropriately suppress the temperature rise in the solar ECU 60 by making the charging period of the pumping charging variable.

Second Embodiment

A description is now given of the second embodiment.

A solar battery system 1A according to the present embodiment is different from the first embodiment in the point that the solar ECU 60 is replaced with a solar ECU 60A and more specifically in the point that a temperature sensor 65A is added to be specific. The solar battery system 1A is different from the first embodiment in the point that the microcomputer 64 is replaced with a microcomputer 64A (see FIGS. 5 and 6) and more specifically in the point that the second charging control unit 643 is replaced with a second charging control unit 643A (see FIG. 6) and a temperature state determination unit 645A (see FIG. 6) is added. Hereinafter, the component members similar to those in the first embodiment are designated by similar reference signs, and a description is mainly given of the difference from the first embodiment.

Figure 5:
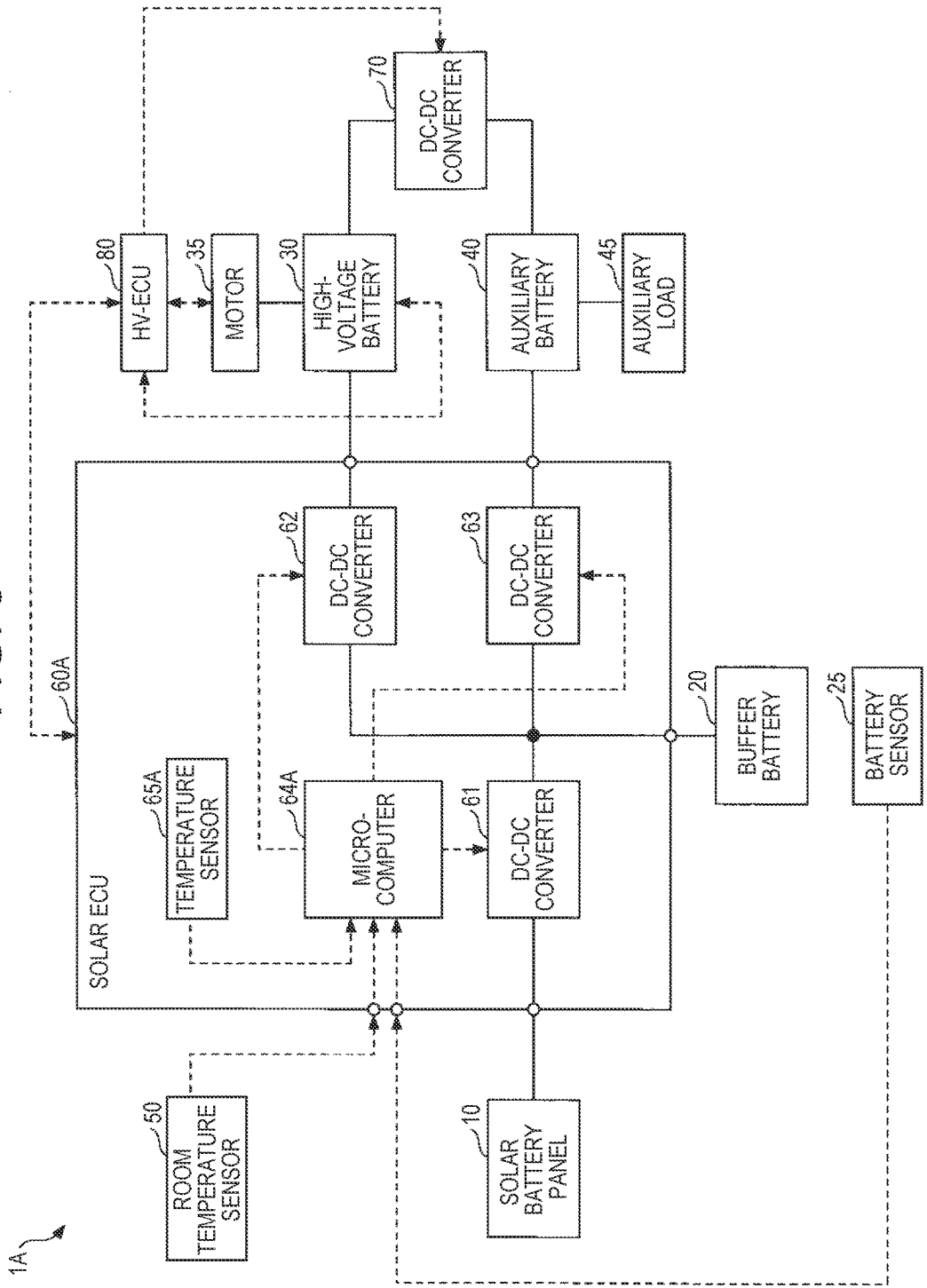
FIG. 5 is a block diagram schematically illustrating one example of the configuration of a solar battery system according to a second embodiment.
Figure 6:
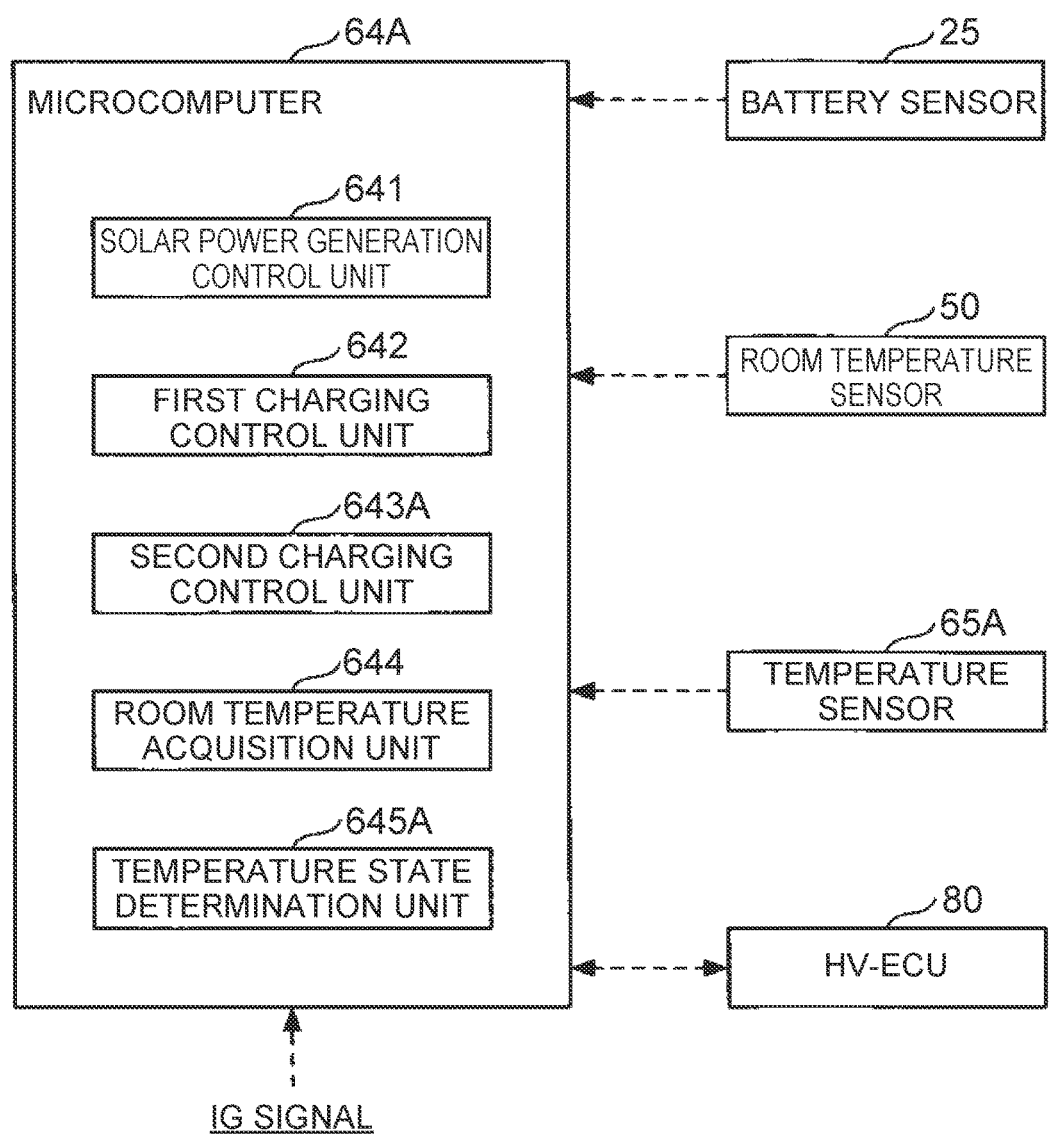
FIG. 6 is a functional block diagram of a microcomputer in a solar ECU according to the second embodiment.

FIG. 5 is a block diagram schematically illustrating one example of the configuration of the solar battery system 1A according to the present embodiment. FIG. 6 is a functional block diagram of the microcomputer 64A according to the present embodiment.

The solar battery system 1A includes the solar ECU 60A.

The solar ECU 60A includes the temperature sensor 65A.

The temperature sensor 65A is, for example, a thermistor that detects temperature of an inside portion (for example, a portion the temperature of which rises the most on an ECU substrate) of the solar ECU 60A, and outputs the detection result (detection signal). The detection signal is input into the microcomputer 64A.

The microcomputer 64A includes the second charging control unit 643A and the temperature state determination unit 645A as function units implemented by executing one or more programs on the CPU.

The second charging control unit 643A performs pumping charging of the high-voltage battery 30 and the auxiliary battery 40 during a period of time from the IG-OFF to the IG-ON of the vehicle. Unlike the first embodiment, the second charging control unit 643A determines the start timing of each charging period in the pumping charging in accordance with the temperature state inside the solar ECU 60A (the decision result by the temperature state determination unit 645A to be specific). The details of the pumping charging by the second charging control unit 643A will be described later.

The temperature state determination unit 645A determines whether or not the temperature state of solar ECU 60A is suitable for starting charging, based on a detection signal input from the temperature sensor 65A. Specifically, the temperature state determination unit 645A acquires an internal temperature Tm of the solar ECU 60A based on the detection signal input from the temperature sensor 65A. The temperature state determination unit 645A then determines whether or not the internal temperature Tm is sufficiently decreased by heat dissipation during the stop period in the pumping charging. When the internal temperature Tm is sufficiently decreased, the temperature state determination unit 645A determines that the temperature state of the solar ECU 60A is suitable for starting the charging. The temperature state determination unit 645A transmits the determination result to the second charging control unit 643A.

Figure 7:
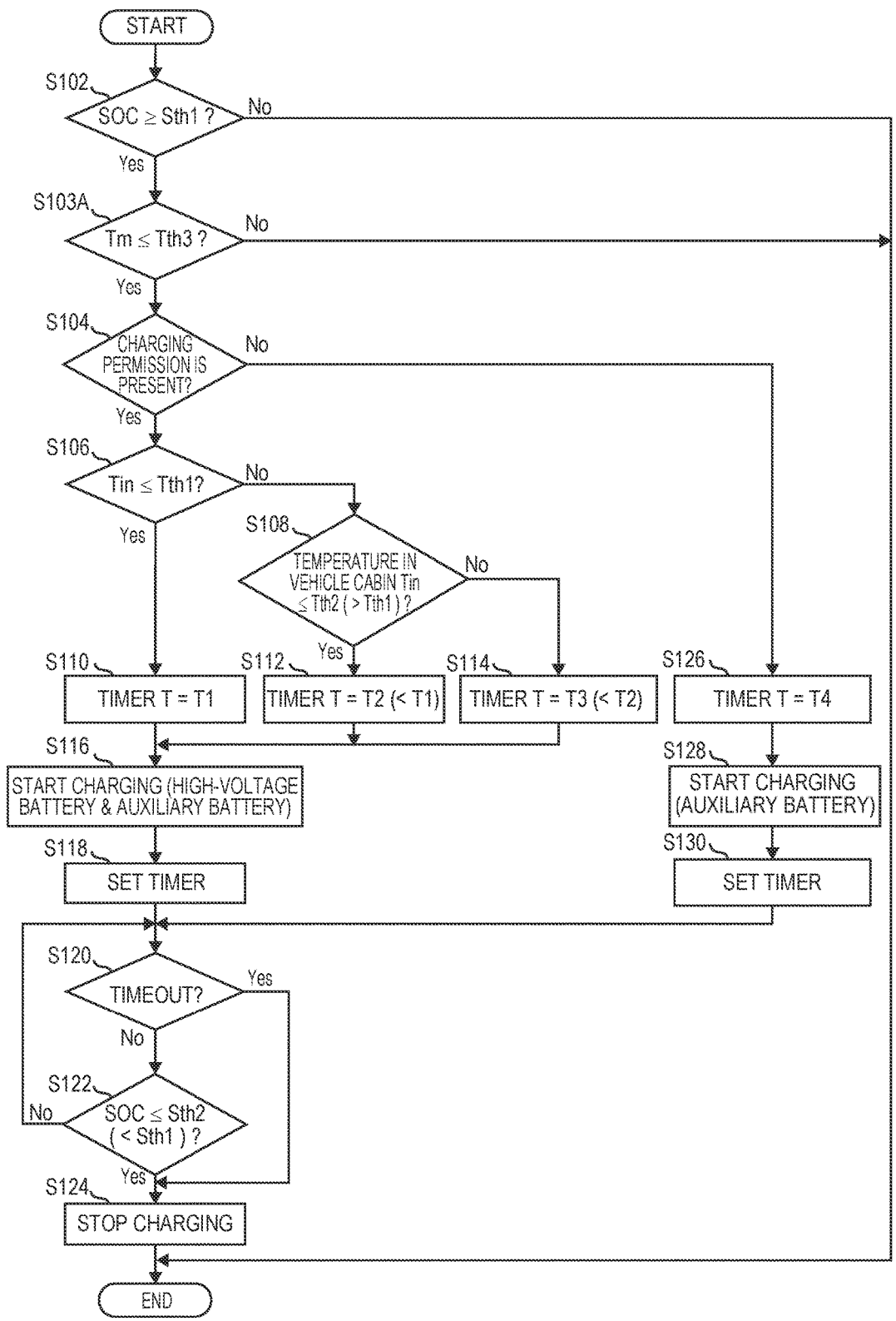
FIG. 7 is a flowchart schematically illustrating one example of pumping charging control processing by the solar battery system (second charging control unit) according to the second embodiment.

A description is now given of the details of the pumping charging by the second charging control unit 643A with reference to FIG. 7.

FIG. 7 is a flowchart schematically illustrating one example of pumping charging control processing by the solar battery system 1A (second charging control unit 643A) according to the present embodiment. The processing based on the flowchart is repeatedly executed at predetermined time intervals during a period of time from the IG-OFF to the IG-ON of the vehicle.

The flowchart is the same as the flowchart in the first embodiment (FIG. 3) except for the point that the processing of step S103A is added between the processing of step S102 and the processing of step S104 in the first embodiment. Therefore, a description is mainly given of the content of the processing different from the first embodiment.

When it is determined that the SOC of the buffer battery 20 is equal to or more than a first threshold Sth1 in step S102, the second charging control unit 643A determines in step S103A whether or not the temperature state determination unit 645A determines that the temperature state of the solar ECU 60A is suitable for starting charging. The temperature state determination unit 645A determines that the temperature state of the solar ECU 60A is suitable for starting charging when, for example, the internal temperature Tm is equal to or less than a specified third threshold Tth3. When the temperature state determination unit 645A determines that the temperature state of the solar ECU 60A is suitable for starting charging, i.e., the internal temperature Tm is equal to or less than the third threshold Tth3, the second charging control unit 643A advances processing to step S104. When the temperature state determination unit 645A does not determine that the temperature state of the solar ECU 60A is suitable for starting charging, i.e., the internal temperature Tm is not equal to or less than the third threshold Tth3, the second charging control unit 643A ends the current processing.

Thus, in the present embodiment, the second charging control unit 643A starts each charging period of the pumping charging when the temperature state determination unit 645A determines that the temperature state of the solar ECU 60A is suitable for starting charging, i.e., the internal temperature Tm of the solar ECU 60A is equal to or less than the third threshold Tth3. Therefore, since the pumping charging is started for the first time when the temperature of the solar ECU 60A decreases to some extent, the temperature rise in the solar ECU 60A can further be suppressed.

In the present embodiment, the solar ECU 60A includes the temperature sensor 65A, and the temperature sensor 65A directly detects the internal temperature Tm. However, the temperature sensor 65A may be omitted, and the internal temperature Tm may be estimated from other information. For example, the temperature state determination unit 645A estimates the internal temperature Tm of the solar ECU 60A during the IG-OFF by using a map and the like prestored in an internal memory, based on the detection result (detection signal) or the like of the room temperature sensor 50 during a period of time from previous IG-ON to IG-OFF of the vehicle. With the internal temperature Tm at the time of the IG-OFF as an initial value, the temperature state determination unit 645A may estimate the internal temperature Tm by using a map and the like prestored in the internal memory, based on the detection result (detection signal) of the room temperature sensor 50 or on information such as the length of each past charging period and stop period. The room temperature acquisition unit 644 acquires the temperature Tin in the vehicle cabin based on the detection signal received from the room temperature sensor 50. However, the room temperature sensor 50 may be omitted, and the temperature Tin in the vehicle cabin may be acquired (estimated) based on the detection signal of the temperature sensor 65A. That is, the room temperature sensor 65A is one example of an output unit that outputs the information about the temperature in the vehicle cabin of the vehicle. For example, the room temperature acquisition unit 644 may estimate the temperature Tin in the vehicle cabin by using a map and the like prestored in the internal memory (such as a map indicating a correlation between the internal temperature Tm in the charging periods, the length of the charging periods, and the temperature Tin in the vehicle cabin, and a map indicating a correlation between change in the internal temperature Tm in the stop periods and the temperature Tin in the vehicle cabin).

Third Embodiment

A description is now given of the third embodiment.

Figure 8:
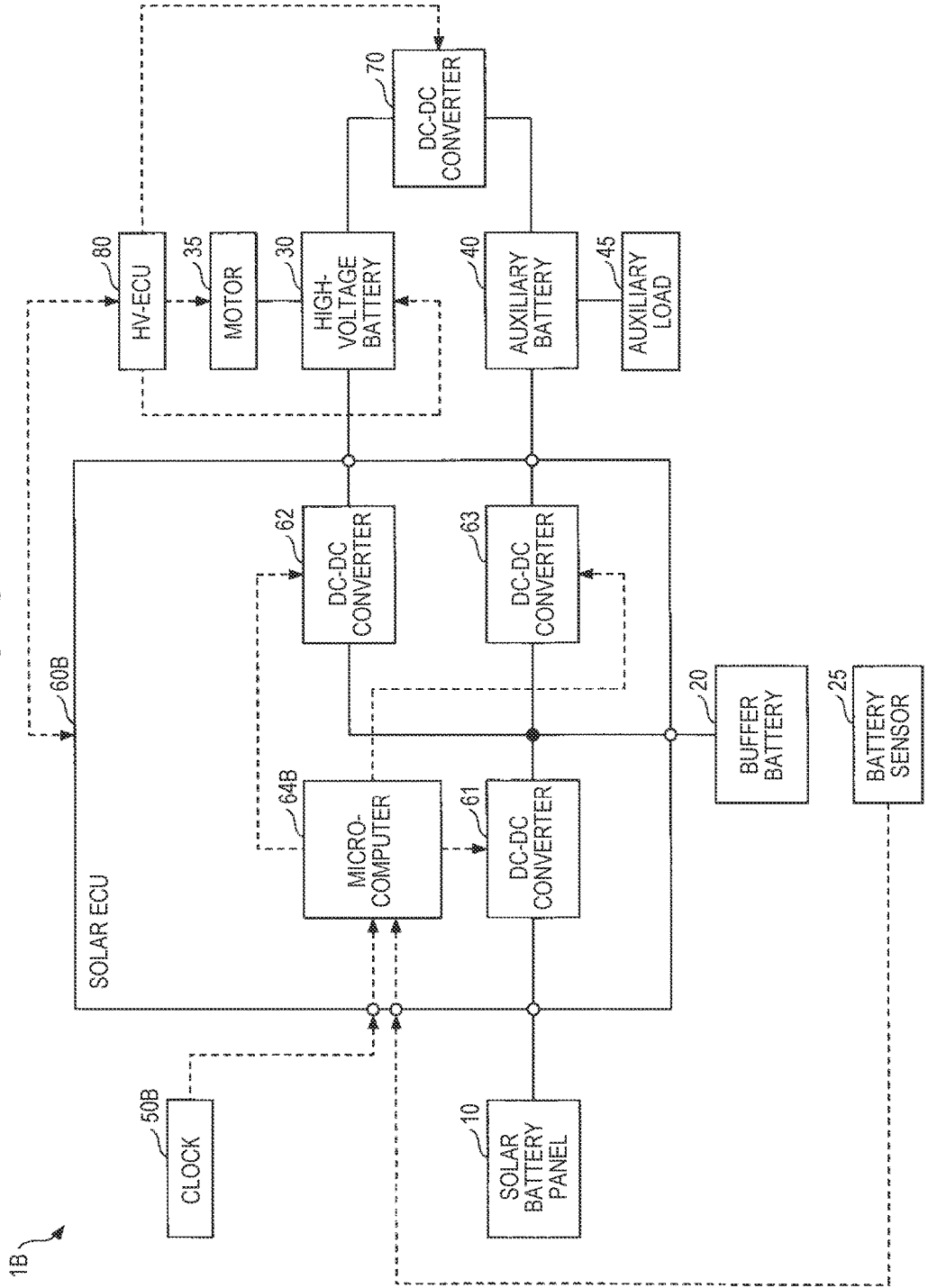
FIG. 8 is a block diagram schematically illustrating one example of the configuration of a solar battery system according to a third embodiment.

A solar battery system 1B according to the present embodiment is different from the first embodiment in the point that the room temperature sensor 50 is replaced with a clock 50B (see FIG. 8). The solar battery system 1B is different from the first embodiment in the point that the solar ECU 60 is replaced with a solar ECU 60B (see FIG. 8), and more particularly in the point that the room temperature acquisition unit 644 is replaced with a room temperature acquisition unit 644B (see FIG. 9), and the microcomputer 64 is replaced with a microcomputer 64B (see FIGS. 8 and 9). Hereinafter, the component members similar to those in the first embodiment are designated by similar reference signs, and a description is mainly given of the difference from the first embodiment.

Figure 9:
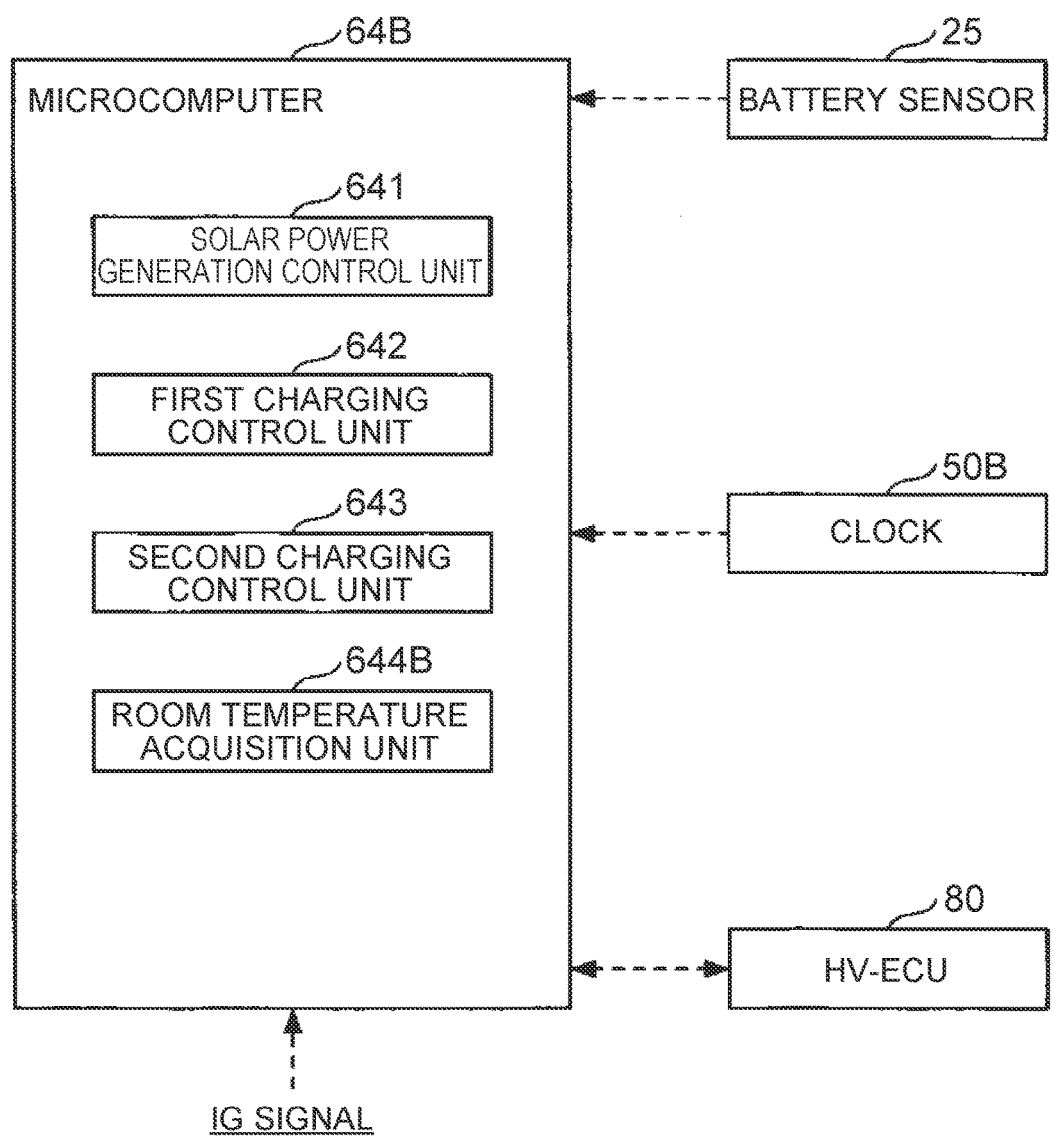
FIG. 9 is a functional block diagram of a microcomputer in a solar ECU according to the third embodiment.

FIG. 8 is a block diagram schematically illustrating one example of the configuration of the solar battery system 1B according to the present embodiment. FIG. 9 is a functional block diagram of the microcomputer 64B of the present embodiment.

The solar battery system 1B includes the clock 50B and the solar ECU 60B.

The clock 50B is one example of an output unit that outputs the information about the temperature in the vehicle cabin of the vehicle. For example, the clock 50B is incorporated in another ECU that can communicate with the solar ECU 60B through an in-vehicle network, such as the CAN, and counts absolute time (year, month, day, hour, minute, and second). The clock 50B outputs the information about time, and the information about the time is transmitted to the solar ECU 60B through an in-vehicle network and the like.

The solar ECU 60B includes a microcomputer 64B.

The microcomputer 64B includes the room temperature acquisition unit 644B.

The room temperature acquisition unit 644B estimates the temperature Tin in the vehicle cabin based on the information about the time input from the clock 50B. For example, the room temperature acquisition unit 644B estimates the temperature Tin in the vehicle cabin using data such as a map indicating a relation between the time stored in the internal memory and the temperature Tin in the vehicle cabin. The room temperature acquisition unit 644B transmits the information about the estimated temperature Tin in the vehicle cabin to the second charging control unit 643.

Thus, the room temperature acquisition unit 644B according to the present embodiment estimates the temperature in the vehicle cabin from the information about the time output by the clock 50B. This makes it possible to omit a device such as the room temperature sensor 50 that measures the temperature in the vehicle cabin, so that the system configuration can be simplified.

Although the room temperature sensor 50 of the first embodiment is replaced with the clock 50B in the present embodiment, the room temperature sensor 50 of the second embodiment may similarly be replaced with the clock 50B. The clock 50B may also be omitted, and the temperature sensor 65A of the second embodiment may be provided in the solar ECU 60. That is, the room temperature acquisition unit 644B may estimate the temperature Tin in the vehicle cabin using data such as a map prestored in the internal memory as described before.

Although the modes for carrying out the present embodiments have been described in detail, the present embodiments are not limited to such specific embodiments. Various modifications and changes may be made without departing from the scope of the present disclosure.

What is claimed is:

1. A vehicle solar battery system, comprising
a solar battery panel mounted in a vehicle;
a first electric storage device that supplies electric power to a predetermined electric load mounted in the vehicle;
a second electric storage device that supplies electric power to an electric motor serving as a driving force source of the vehicle;
a first electric power converter provided between the solar battery panel and the first electric storage device;
a second electric power converter provided between the solar battery panel and the second electric storage device;
a first control unit that controls the first electric power converter so as to charge the first electric storage device based on generated electric power of the solar battery panel during a period of time from ignition-on to ignition-off of the vehicle;
a second control unit that controls the second electric power converter so as to charge the second electric storage device based on generated electric power of the solar battery panel, the second control unit repeating a charging period and a stop period during a period of time from ignition-off to ignition-on of the vehicle, the charging period being a period of charging the second electric storage device based on the generated electric power of the solar battery panel, the stop period being a period of stopping the charging of the second electric storage device based on the generated electric power of the solar battery panel, and
an acquisition unit that acquires temperature in the vehicle cabin of the vehicle, wherein
the second control unit controls a length of each of the charging periods, based on the temperature in the vehicle cabin acquired by the acquisition unit.

2. The vehicle solar battery system according to claim 1, further comprising a clock that outputs time, wherein
the acquisition unit estimates the temperature in the vehicle cabin from the time.

3. The vehicle solar battery system according to claim 1, further comprising a room temperature sensor that detects the temperature in the vehicle cabin, wherein the acquisition unit acquires the temperature in the vehicle cabin based on an output signal of the room temperature sensor.

4. The vehicle solar battery system according to claim 1, further comprising an electronic control unit disposed in the vehicle, the electronic control unit including the first control unit, the second control unit, and the acquisition unit; and
a determination unit that determines a temperature state of the electronic control unit, wherein
the second control unit starts the charging periods, when the determination unit determines that the temperature of the electronic control unit is equal to or less than a specified temperature.

5. A solar battery system, comprising:
a solar battery mounted in a vehicle;
an electric storage device that supplies electric power to an electric motor serving as a driving force source of the vehicle;
an electric power converter provided between the solar battery and the electric storage device; and
a first electronic control unit disposed in a vehicle cabin, the first electronic control unit including
a control unit that operates the electric power converter so as to charge the electric storage device with generated electric power of the solar battery, the control unit repeating a charging period and a stop period during a period of time from ignition-off to ignition-on of the vehicle, the charging period being a period of charging the electric storage device with the generated electric power, the stop period being a period of stopping the charging of the electric storage device with the generated electric power, and
an acquisition unit that acquires temperature in the vehicle cabin of the vehicle, wherein
the control unit sets a length of each of the charging periods shorter as the temperature in the vehicle cabin is higher, the temperature being acquired by the acquisition unit at a time of starting each of the charging periods;
the solar battery system further comprising:
a controller, wherein
the controller includes a first charging control unit and a second charging control unit,
the first charging control unit performs operation control of the electric power converter during a period of time from the ignition-on to the ignition-off of the vehicle so as to perform control processing that charges an auxiliary battery with the generated electric power of the solar battery,
the second charging control unit performs operation control of the electric power converter during a period of time from the ignition-off to the ignition-on of the vehicle so as to perform control processing that charges the electric storage device and the auxiliary battery with the generated electric power of the solar battery,
the second charging control unit transmits a signal requesting permission of charging the electric storage device to a second electronic control unit that performs integrated control of the entire vehicle at a time of starting each of the charging periods,
when a permission signal is received from the second electronic control unit that performs integrated control of the entire vehicle, the second charging control unit performs control of repeating the charging period and the stop period for the electric storage device and performs control of repeating a charging period and a stop period for the auxiliary battery, the charging period being a period of charging the auxiliary battery with the generated electric power, the stop period being a period of stopping charging of the auxiliary battery with the generated electric power, and
when the permission signal is not received, the second charging control unit performs control of repeating the charging period and the stop period for the auxiliary battery, while maintaining the electric storage device in a charging stop state.

* * * * *